United States Patent

[11] 3,572,924

| [72] | Inventors | Yushi Matsumoto;<br>Tsuneo Tashiro, Tokyo, Japan |
|------|-----------|------------------------------------------------|
| [21] | Appl. No. | 766,124 |
| [22] | Filed | Oct. 9, 1968 |
| [45] | Patented | Mar. 30, 1971 |
| [73] | Assignee | Tokyo Shibaura Electric Co., Ltd.<br>Kawasaki-shi, Japan |
| [32] | Priority | Oct. 12, 1967 |
| [33] | | Japan |
| [31] | | 42/65,181 |

[54] COPYING APPARATUS
9 Claims, 3 Drawing Figs.

[52] U.S. Cl. ............................................. 355/27,
355/43, 355/45, 355/57, 355/60, 355/66
[51] Int. Cl. ............................................. G03b 27/70
[50] Field of Search ............................................. 355/27, 43,
45, 57, 65, 66, 60

[56] References Cited
UNITED STATES PATENTS

| 2,927,503 | 3/1960 | Zollinger | 355/60 |
| 3,437,410 | 4/1969 | Tregay et al. | 355/57 |

*Primary Examiner*—Samuel S. Matthews
*Assistant Examiner*—Richard A. Wintercorn
*Attorney*—George B. Oujevolk

ABSTRACT: A copying apparatus including an optical system for reproducing an original on a copying paper, each of the original and the copying paper having its one edge located at a definite position. The optical system is arranged such that the edge of the original is always focused on the edge of the copying paper with the original reproduced in a predetermined area of the copying paper irrespective of the multiplying power.

PATENTED MAR 30 1971

Yoshi Matsumoto
Tsuneo Toshiro
INVENTOR.

BY George B. Anjirath
Attorney

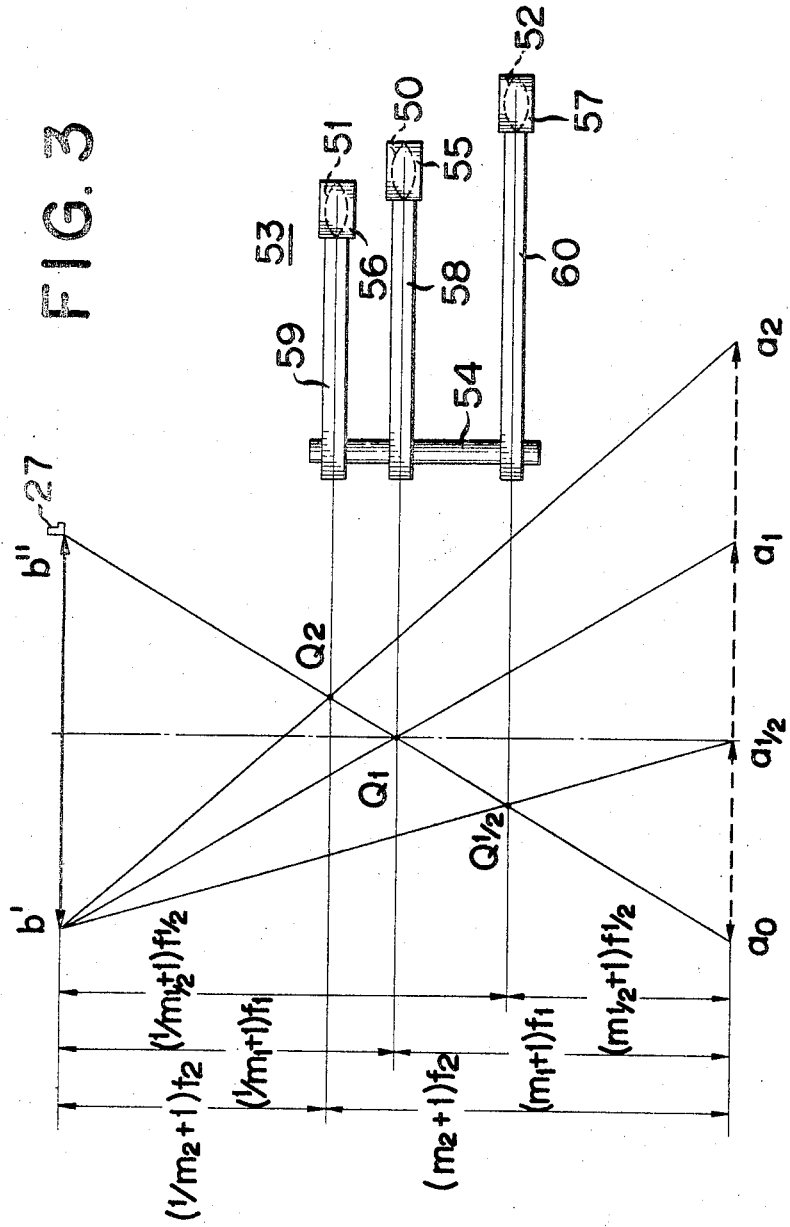

COPYING APPARATUS

This invention relates to an improved copying apparatus capable of reproducing copies of any magnifying power from an original of a definite size, and more particularly to a copying apparatus capable of producing copies contained in the area of a copying paper by maintaining one edge of the original and one edge of the copying paper at predetermined positions irrespective of the magnifying power.

With recent increase in the quantities of information use of a copying apparatus especially of the electrostatic recording type has become common. Thus, it is possible to reproduce a desired number of copies from an original such as reference literature, a manuscript, drawing or photograph. Depending upon the size of the original it is desirable to print it on a most economical and easy to handle copying paper.

To meet this requirement a copying apparatus has been proposed wherein copying papers of various sizes are prepared and copies of the desired size can be provided by varying the magnifying power. The copying apparatus of this type can be classified into two types, i.e. one in which the lenses are exchanged to vary the magnifying power and the other in which a single lens of variable magnifying power is used. In the former type a plurality of lenses corresponding to respective magnifying powers are provided on an optical axis interconnecting the surfaces of the original and the copying paper to selectively use said lenses whereas in the latter type, a single lens is provided on the optical axis and the position of the lens is varied in accordance with the selected magnifying power concurrently with the parallel movement of the copying paper or the original paper.

In both of these types, the relationship among the positions of the original paper, copying paper and lens disposed therebetween is as follows: Assuming now that $m$ represents the magnifying power and $f$ the focal length of the lens, then the distance between the original and lens can be expressed by $(1/m+)f$ and that between the copying paper and the lens by $(m+1a'f$. Thus, it is possible to produce a copy of the desired magnifying power by disposing the original, copying paper and lens at such positions that satisfy above described relations.

However, in each of these two types of copying apparatus inasmuch as the position of the optical axis is fixed it is required to set the centers of the original paper and the copying paper to be always on the optical axis. In other words, unless the copying paper is arranged with its center coinciding with the optical axis the printed image would not be contained in the prescribed area of the copying paper. Where only one size of the copying paper is selected and where the multiplying power is constant, the position of the copying paper could be made constant by maintaining one edge of the copying paper at a definite position, thus causing no problem. On the other hand, where copying papers of varying size are used and where the magnifying power is varied, even when one edge of the copying paper is maintained at a definite position, the position of its center would be varied dependent upon the size of the copying paper so that it would become necessary to align the center of each copying paper with the optical axis. Such operations are very complicated and troublesome. Especially in the copying apparatus wherein copying papers are automatically fed, there is provided a mechanism for automatically centering copying papers regardless of their size, but such mechanism is not suitable for practical use because it requires the provision of a complicated cam mechanism and a control circuit. Further, as it is required to stop the copying paper in the light exposure area with its center position coincided with the optical axis irrespective of the size of the paper, the stopping mechanism becomes complicated. More particularly, where the size of the copying paper does not change an ordinary detecting means can be used wherein the position of the leading edge of the paper is detected by a microswitch or the like. However, where the size of the copying paper varies as above described, the position of its center with respect to its leading edge also varies so that it is not possible to use simple detecting means.

Thus, as it is very difficult to maintain the center of the copying paper always at a definite position it is highly desirable to provide an improved copying apparatus capable of reproducing a copy of the original in the predetermined area of the copying paper by maintaining one side edge thereof at a definite position irrespective of the size of the copying paper or the magnifying power.

Accordingly, it is an object of this invention to provide a new and improved copying apparatus capable of reproducing a copy of the desired magnifying power in a predetermined area of a copying paper with one edge maintained at a definite position with regard to an original which also has one edge maintained at a definite position.

A further object of this invention is to provide a copying apparatus of simple construction including a single lens and capable of reproducing a copy in a predetermined area of the copying paper with varying magnifying power.

Still further object of this invention is to provide a copying apparatus of simple construction including a single lens and capable of reproducing copies of varying magnifying power in a predetermined area of the copying paper by a simple operation.

Another object of this invention is to provide a copying apparatus of simple construction including a plurality of lenses and capable of reproducing copies of varying magnifying power in said predetermined area of the copying paper.

Yet another object of this invention is to provide a copying apparatus wherein copying papers are fed automatically to reproduce copies of the original of the desired multiplying power in a predetermined area of the copying paper.

According to this invention, there is provided a copying apparatus comprising means to position flatly a copying paper having an image-recording surface with one edge thereof located at a definite position, means to position flatly an original to be copied with one edge thereof located at a definite position, means to illuminate said original, an optical system to focus light from said original on said copying paper to expose said recording surface to said light and means to develop said exposed copying paper, said optical system being arranged such that said one edge of said original is always focused on said one edge of said copying paper, whereby the image of said original can be reproduced in a predetermined area of said copying paper irrespective of the multiplying power.

The above-mentioned and further objects of this invention can be more fully understood from the following detailed description taken in connection with the accompanying drawings, in which:

FIG. 3 shows a simplified optical system employed in the copying apparatus.

Figure 1:
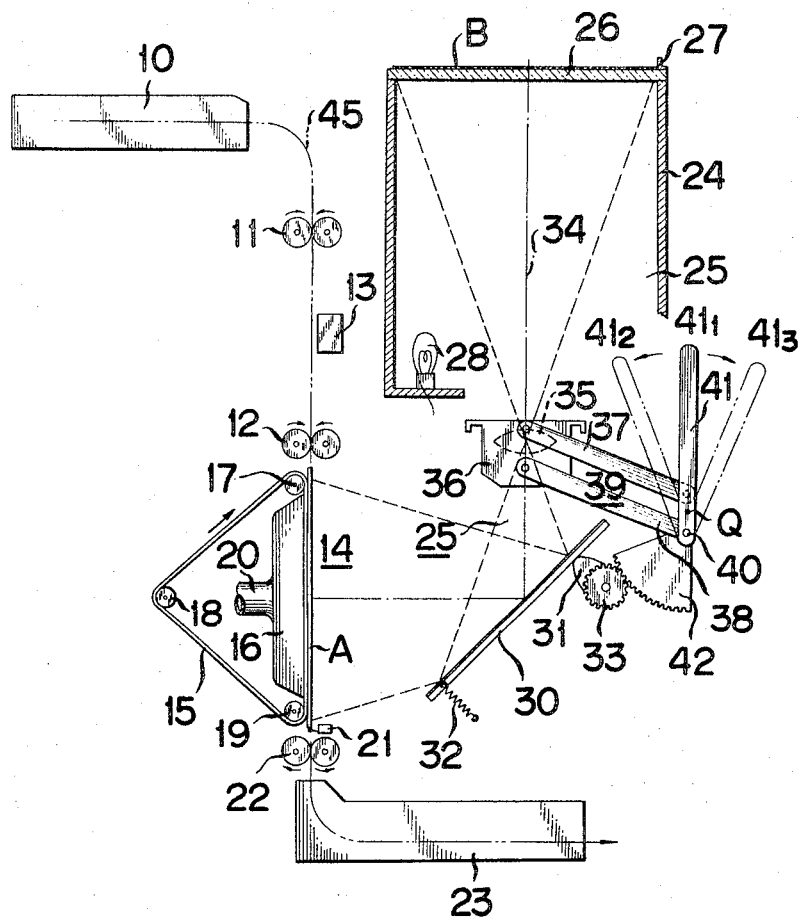
FIG. 1 shows a diagrammatic side elevation of the copying apparatus.

Referring now to the accompanying drawings which show one embodiment of the copying apparatus of the electrostatic recording type, in FIG. 1 there is shown a paper-feeding device 10 containing a plurality of stacked sheets of copying papers. The paper-feeding device is constructed such that copying papers are payed out one after the other from the bottom thereof. The surface of each of these copying papers is provided with a photoconductive coating of zinc oxide(ZnO), for example, to form an image recording surface. On the exit side of the paper feeding device 10 are disposed a plurality of pairs of feed rollers 11 and 12 at a suitable spacing to supply the copying papers payed out of the paper feeding device to a light exposure device to be described later. Alternatively, a roll of the copying paper may be housed in the paper-feeding device 10 and the web of the paper may be cut into predetermined length while it is fed through feed rollers 11, for example. Between feed rollers 11 and 12 is disposed a suitable electrostatic charging device 13 having a wire electrode (not shown) energized by a negative high potential for example in order to apply uniform negative charge to the image recording surface of the copying paper passing thereof.

On the exit side of the feed rollers 12 is disposed a light exposure device 14 comprising a belt means 15 and suction device 16. More specifically, belt means 15 comprises a plurality of closely spaced parallel endless belts of relatively narrow width passing around rollers 17, 18 and 19, and the suction side of the suction device 16 is disposed to oppose the inner side of belts. A rear pipe 20 of the suction device 16 is connected to a suitable evacuating device (not shown) to attract the entire surface of the copying paper A carried by belt means 15 against the outer surface of belts to maintain the copying paper A in flat state at the time of light exposure to be described later. As the copying paper A arrives at the light exposure device 14, its leading edge is detected by a suitable detecting device such as microswitch 21 whereby the copying paper is stopped at a predetermined position of the light exposure device 14. For this reason, the leading edge of the copying paper A will be maintained always at a definite position irrespective of its size. After exposure, the copying paper is advanced further. On the exit side of the light exposure device 14 is located a pair of feed rollers followed by a developing device 23 containing positively charged developing agent consisting of minute particles of carbon, for example. An original B to be copied is disposed at a definite position on a transparent support plate of glass 26 on the upper end of a dark chamber 25 comprised by an enclosing frame 24. More particularly, a stop 27 having a letter L-shaped cross section is secured to one side edge of the supporting plate 26 to hold the original B with its one edge engaged with the stop 27. A lamp 28 is mounted on the bottom of the dark chamber 25 to uniformly illuminate the original B for a definite time interval whereby the illuminated image on the original B is focused on the surface of the copying paper A through an optical system 29. It will be noted that surfaces of the copying paper A in the light exposure device 14 and of the original B on the supporting plate 26 are perpendicular with each other whereas the surface of an inclined reflecting mirror 30 disposed between the original and copying paper makes 45° with respect to each of them. This reflecting mirror is arranged to be moved by a guide mechanism, not shown, while always preserving said 45° relationship and is supported at three points by cam members 31 (only one of them is shown) having a particular configuration to be described later. The opposite ends of the mirror are biassed downwardly by springs 32 (only one of them is shown) to urge against the cam member 31 which is integral with a gear 33.

Above the reflecting mirror 30 is disposed a lens supporting member 36 carrying a lens 35 such that its optical axis intersects perpendicularly with the original B or supporting plate 26. Pairs of parallel levers 37 and 38 are pivotally connected at one end to the opposite surfaces of the supporting member 36. The outer ends of levers 37 and 38 are pivotally connected to a machine frame, not shown, thus constituting a parallelogram 39. Accordingly the holding member 36 and hence lens 35 will have its optical axis 34 moved in parallel. As shown in FIG. 1, lower end of the handle 41 is secured to the outer end of link 38.

Accordingly, when the handle 41 is rotated by a predetermined angle, for example, by manual operation, the lens 35 will be moved, as hereinbelow stated, along a circle having its center located at a point above the axis 40. In this case, the optical axis 34 of the lens 35 is moved, by the parallel link 39, in parallel so as to be always normal to the supporting plate 26.

A sector gear 42 is connected to the pivotal axis 40 to mesh with said gear 33. Thus the reflecting mirror 30 is moved to the position to be described later in an interlocked relation with lens 35 by the operation of the handle 41.

Figure 2:
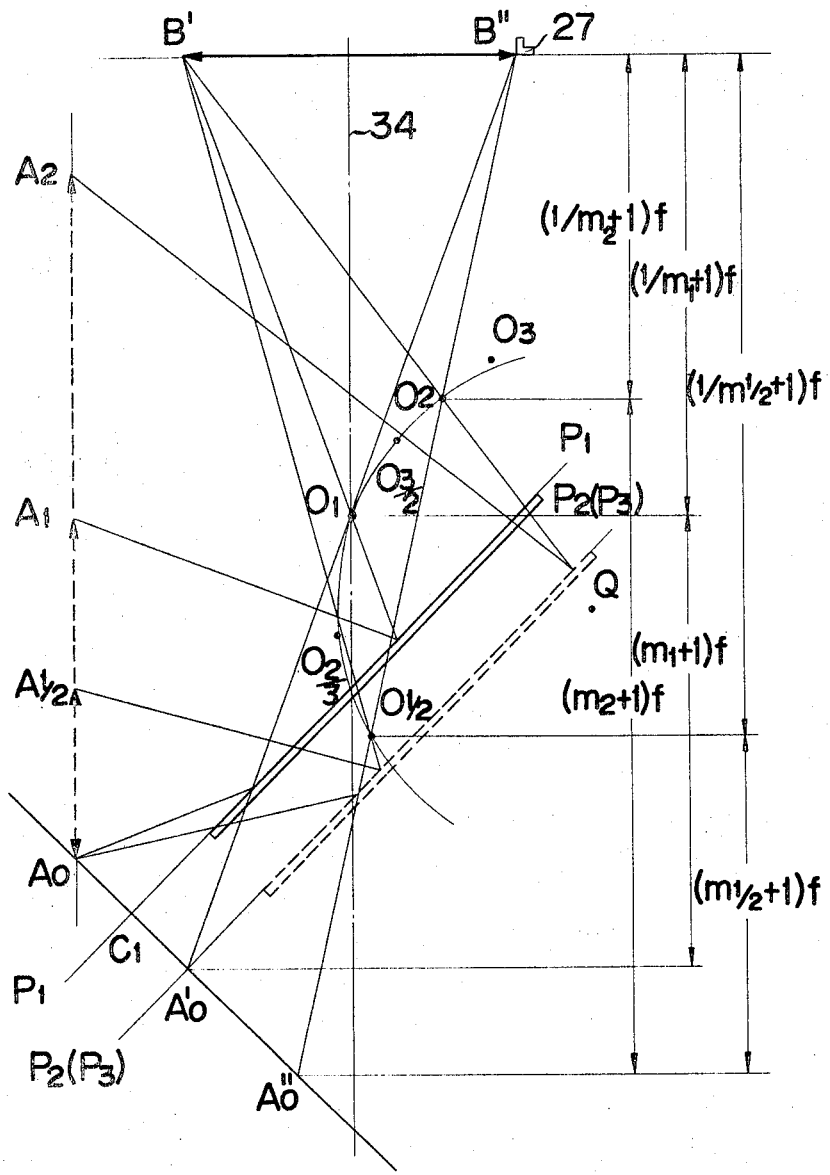
FIG. 2 is a graph helpful to explain the principle of this invention.

The principle of operation of the mechanism shown in FIG. 1 will be considered hereunder with reference to FIG. 2. In this drawing, B'B'' represents matter to be copied on the original B, $O_1$ the position of lens 35 at a multiplying power of 1 : 1 and $P_1P_1$ the position of the reflecting mirror 30. Then an image $A_0A_1$ will be focused on the copying paper A held at the light exposure device 14. Denoting by $C_1$ the point of intersection between a straight line passing through point $A_0$ and line $P_1P_1$ normal thereto and by $A'_0$ the point of intersection between $B''0_1$ and $A_0C_1$, then points $A_0$ and $A_0'$ are in the relation of a mirror image with respect to the reflecting mirror 30 or line $P_1P_1$. Thus $A_0C_1=A_0'C_1$. Assuming now that $f$ represents the focal length of lens 35 and that $m_1$ the multiplying power, then the distance between the position of lens $0_1$ and B'B'' can be expressed by $(1/m_1 +1)f$, the optical distance between lens positions $0_1$ and $A_0$ and hence the distance between points $0_1$ and $A_0'$ as measured along the optical axis 34 by $(m_1 +1)f$ and that between B'B'' and $A_0'$ by $(m_1 +1/m_1 +2)f$. Above expressions represent the relationship between lens 35 and reflecting mirror 30 for a multiplying power of 1:1. The relationship between the lens and the reflecting mirror for a multiplying power of 1:2 can be determined as follows: It is now assumed that $m_2$ represents this latter multiplying power and then $A_0''$ represents the point of intersection between $A_0C_1$ and a line parallel to BB' at a distance of $(m_2 +1/m_2 +2)f$. When a straight line $P_2P_2$ is drawn in parallel with plane of the reflecting mirror 30 and through a midpoint (in this case coincides with $A_0'$) between $A_0$ and $A_0''$, this line $P_2P_2$ will represent the new position of the reflecting mirror 30. If a point $0_2$ is selected on line $B''A_0''$ at a distance of $(1/m_2 +1)f$ from B'B'' measured in the direction of the optical direction 34 this point will represent the new position of lens 35. Then the reproduced image will be shown by $A_0A_2$. Similarly, positions of the lens and reflecting mirror for m½or for a multiplying power of 1: ½can be represented by $0½$ and $P_3P_3$, respectively. Accordingly, the position of the reproduced image will be shown by $A_0A½$ In this case line $P_3P_3$ coincides with line $P_2P_2$. In the same manner, the positions of the lens for $m = 2/3$, 3/2 and 3 can be shown by $0_{2/3}$, $0_{3/2}$ and $0_3$, respectively. By describing a circle Q passing through three positions of the lens for practical values of multiplying powers, for example, $m=½$ 1 and 2, it can be noted that other three positions $0_{2/3}$, $0_{3/2}$ and $0_3$ also line on substantially the same circle. However, for values of $m$ larger than 5 or less than ¼ the position of the lens is located outside this circle. But for multiplying powers in a range of from ½to 3 the line is positioned substantially on said circle Q so that by positioning the center of this circle at a point spaced in the direction parallel to the optical axis 34 from the axis 40 by a distance equal to that between the pivotal axis of the link 38 for the lens supporting member 36 and the center of the lens it becomes possible to move lens 35 along circle Q. The configuration of the cam 31 adapted to support reflecting mirror 30 is so determined that reflecting mirror 30 assumes a position corresponding to respective multiplying power.

The operation of the copying apparatus shown in FIG. 1 is as follows:

At first the original B which is to be copied is placed on the supporting plate 26 with its one edge abutted against the stop 27. Then feed rollers 10 and 12, belt means 15, feed roller 22 are driven in the direction indicated by arrows to transfer a copying paper supplied by the paper-feeding device 10, the path of travel of the copying paper being indicated by a dot and dash line 45. The image recording surface of copying paper A is uniformly charged with negative charge by means of charging device 13 and then enters into the light exposure device 14. When its leading edge reaches a predetermined position the microswitch 21 is operated thereby stopping respective microswitches and belt means 15 to maintain the copying paper A at said predetermined position. At this position the copying machine is attracted by the suction device 16 against the surface of belts 15 and thus maintained in a flat condition. Operation of the microswitch also energizes lamp 28 for a predetermined time interval to uniformly illuminate the lower surface of the original B.

Assuming a multiplying power of 1:1, the operating handle 41 is manipulated to bring lens 35 and reflecting mirror 30 to positions $0_1$ and $P_1P_1$, respectively, shown in FIG. 2. Under this condition, the image B'B" on the original B will be focused on the surface of the copying paper A as an image $A_0A_1$. Accordingly, when exposed to light, bright portions of the image become conductive to discharge the charge thereof whereas dark portions preserve their insulating property whereby the electrostatic latent image thereon is preserved. After exposure, rollers 22 and belt means 15 are again started to transfer the exposed copying paper A into the developing device 23 wherein the latent image is developed to produce a copy of the image by means of charged particles of carbon. If desired, the developed image can be fixed in a manner well known in the art.

Where it is desired to obtain a copy of the original B at a reduced scale, for example, at a multiplying power of ½ the operating handle 41 is rotated to a second position $41_2$ thus bringing lens 35 and reflecting mirror 30, respectively to positions $0_{1/2}$ and $P_3P_3$, shown in FIG. 2. Consequently, the axis 34 of the lens 35 is also moved in parallel. At this time, copying papers A of one-half size are stored in the paper-feeding device 10 and by a similar operation to that already described a reduced image $A_0A_{1/2}$ of the original image B"B can be reproduced on the copying paper.

Where an enlarged copy of the original B is to be reproduced, the operating handle 41 is rotated to a third position $41_3$ thus bringing lens and reflecting mirror to positions $0_2$ and $P_2P_2$, respectively, shown in FIG. 2. Accordingly, the optical axis 34 of the lens 35 is also moved in parallel. At this time, copying papers having a larger size, for example double size, than said copying paper A are stored in the paper-feeding device 10. By the identical operation an enlarged image $A_0A_2$ can be reproduced on the copying paper. While in the above, for the purpose of description, the same original B has been used, it should be understood that, actually an original of smaller size is to be used.

Thus the optical system is constructed such that, irrespective of the multiplying power or the size of the copying paper, the leading edge or a particular size edge of the copying paper is maintained at a definite position and one edge of the original also maintained at a definite position is focused on said side edge of the copying paper. Any desired value of multiplying power may be selected and the recording system may be of any other systems such as a diazosystem. Alternatively, the copying paper may be manually placed in the light exposure portion to bring its leading edge to said definite position.

While the above-described embodiment employs a single lens system, FIG. 3 shows a modified embodiment of this invention wherein a plurality of lenses of different types are selectively used. In this case an original and a copying paper at the light exposure position are positioned in parallel. A lens 50 having a focal length $f_1$ is located at a position $\theta_1$ to focus an image b'b" to be reproduced as a reproduced image $a_0a_1$ at a multiplying power of 1:1. A selected lens is located on a line b"$a_0$ so that one edge b" of the original may always be focused on the predetermined edge of the copying paper that is edge $a_0$ irrespective of the multiplying power employed. Thus, for example, by denoting a multiplying power 1:2 by $m_2$, a selected lens 51 should be placed at a point of intersection $\theta_2$ between a line parallel to b'b" and spaced therefrom by a distance $(1/m_2 1)f_2$, said lens having a focal length represented by $f_2 = (m_1+1/m_1+2)f_1/(m_2+1/m_2+2)$. Similarly, by denoting another multiplying factor $m=\frac{1}{2}$ by $m_{1/2}$, the position $\theta_{1/2}$ of another lens 52 can be determined.

Accordingly, a lens exchange device 53 is provided which is so constructed that lenses 52, 50 and 51 can be selectively brought to their operating positions $\theta_{1/2}$, $\theta_1$ and $\theta_2$, respectively with their optical axes maintained in parallel. Thus shaft 54 of the lens exchange device is supported in parallel with the optical axes to respective lenses by a suitable mechanism not shown. The shaft 54 supports arms 58, 59 and 60, the outer ends thereof supporting lens holders 55, 56 and 57 for lenses 50, 51 and 52, respectively. The lengths of these arms 58, 59 and 60 are selected such that the distances between the axes of respective lenses and the axis of shaft 54 are equal to distances between points $\theta_1$, $\theta_2$ and $\theta_3$ and the axis of shaft 54. Further these arms are located at distances $(1/m_1+1)f_1$, $(1/m_2+1)f_2$ and $(1/m_{1/2}+1)f_{1/2}$, respectively, from the original b'b".

In the same manner as above described, to provide copies of the desired multiplying power, one of the arms 58, 59 and 60 respectively supporting a lens having the corresponding multiplying power is selectively operated to the operating position. It is to be understood that, disposition of the original, supply of the copying paper, charging, light exposure and developing operations are performed in the same manner as in the previous embodiment.

We claim:

1. A copying apparatus comprising means to position flatly a copying paper having an image-recording surface with one edge thereof located at a definite position, means to position flatly an original to be copied with one edge thereof located at a definite position, means to illuminate said original, an optical system to focus light from said original on said copying paper to expose said recording surface to said light and means to develop said exposed copying paper, said optical system being arranged such that said one edge of said original at said definite position is always focused on said one edge of said copying paper at said definite position, whereby the image of said original can be reproduced in a predetermined area of said copying paper irrespective of the multiplying power.

2. A copying apparatus according to claim 1 wherein said optical system comprises a lens to collect light from said original and a reflecting mirror to reflect the light passed through said lens and to project it upon said copying paper, said lens is arranged to be moved along a circle passing through at least three points at which said lens is to be located corresponding to different multiplying powers while maintaining the optical axes of said lens in parallel and said reflecting mirror is arranged to be moved to parallel positions in an interlocked relation with the movement of said lens.

3. A copying apparatus according to claim 2 wherein said reflecting mirror is mounted on at least one cam interlocked with the movement of said lens whereby the reflecting mirror is moved in parallel in accordance with the rotary movement of said cam.

4. In a copying apparatus comprising means to position flatly a copying paper having an image-recording surface with one edge thereof located at a definite position, means to position flatly an original to be copied with one edge thereof located at a definite position, means to illuminate said original, an optical system to focus light from said original on said copying paper to expose said recording surface to said light and means to develop said exposed copying paper, said optical system being arranged such that said one edge of said original is always focused on said one edge of said copying paper, so that the image of said original can be reproduced in a predetermined area of said copying paper irrespective of the multiplying power, the improvement therein wherein said optical system comprises a plurality of lenses of different focal lengths to collect the light from said original and means to selectively bring one of said lenses to an operating position on a straight line interconnecting one edge of said original and one edge of said copying paper, corresponding to each other.

5. A copying apparatus comprising:
   a. means to flatly position a copying paper having an image-recording surface with one edge thereof located at a definite position;
   b. means to flatly position an original to be copied with one edge thereof located at a definite position;
   c. means to illuminate said original;
   d. an optical system to focus light from said original on said copying paper to expose said recording surface to said light arranged such that said one edge of said original is always focused on said one edge of said copying paper, said optical system including a lens to collect light from said original and a reflecting mirror to reflect the light passed through said lens and to project it upon said copying paper, said lens being arranged to be moved along a circular path passing through at least three points at which said lens is to be positioned corresponding to different multiplying powers while maintaining the optical axis to said lens parallel to its other positions and said reflecting mirror is mounted on cam means interlocked with the movement of said lens so that said reflecting mirror is disposed in parallel planes in an interlocked relation with the movement of said lens; and, e. means to develop said exposed copying paper, whereby the image of said original can be reproduced in a predetermined area of said copying paper irrespective of the multiplying power.

6. A copying apparatus according to claim 5 wherein said means to position the leading edge of said copying paper comprises means to transfer a copying paper supplied from a paper-feeding device and means to detect the leading edge of said copying paper to stop a transfer mechanism.

7. A copying apparatus for reproducing original material in various sizes on copying paper, said apparatus comprising means to flatly position the copying paper and the original paper each in a separate plane so that one edge of said original and copying papers are in predetermined locations, the planes of said original and copying papers being at an angle to each other, the centerline of the plane defined by said original material forming a first optical axis, and optical system including a lens and a flat mirror, the instantaneous location of which defines a mirror plane interposed between said original and copying paper positions, and, mechanical and cam means interlocking said mirror and said lens so that said various mirror planes to which said mirror is moved are parallel, said lens traveling to predetermined lens positions of magnifying powers corresponding to magnifications between 1/2 to 5, said path of travel being along an arc of a circle having its center on a line parallel to said first optical axis.

8. A copying apparatus according to claim 7 wherein said lens is supported by a lens supporting member pivotally connected to a pair of parallel links pivotally connected on a machine frame so as to form a parallelogram and moved by operating a handle secured to one of said links.

9. An apparatus as claimed in claim 7, including a handle member (41) said lens (35) being held on a holding member (36) holding said lens so that the lens optical axis is always normal to that of said copying paper plane, pairs of parallel levers (37, 38) pivotably connected to opposite surfaces of said supporting member and to said handle members, gearing between said handle member (41) and a cam member (31) said cam member acting on said mirror, and spring means (32) holding said mirror against said cam member.